Patented Sept. 26, 1950

2,523,709

UNITED STATES PATENT OFFICE 2,523,709

HIGH-VISCOSITY STARCH ETHERS AND PROCESS OF PREPARING SAME

Owen A. Moe, Minneapolis, Minn., assignor to General Mills, Inc., a corporation of Delaware No Drawing. Application July 18, 1946,
Serial No. 684,534

10 Claims. (Cl. 260—233.3)

The present invention relates to high viscosity starch ethers, more particularly carboxyalkyl starch ethers displaying phenomenal viscosities in aqueous solution.

Some starch ethers have been reported in the literature. For example, it is known that it is possible to produce sodium carboxymethyl starch by the reaction of chloracetic acid on sodium starch. Chowdhury (Biochem. Zeit 148, 85 (1924) described a sodium carboxymethyl starch having a degree of substitution of from 1-2 ether groups per glucose unit. Products of this type, however, do not exhibit any appreciable viscosity characteristics.

The present inventor has found that it is possible to produce carboxyalkyl starch ethers of varying degrees of substitution which exhibit phenomenal viscosities in dilute aqueous solutions. These results have been obtained, in general, by the elimination of the water soluble electrolytes from the product and by adjusting the pH of the product to a point below that of the alkali metal carboxyalkyl starch derivative in which all carboxyl groups are present as the alkali metal salts, which for purposes of simplicity will be referred to as the normal alkali metal carboxyalkyl starch derivative. Thus the pH may be generally within the range of 4-7, preferably between 5.5 and 7.0, although in the case of some derivatives it may be as high as 9 as will be shown more fully hereinafter.

It is, therefore, a primary object of the present invention to provide novel carboxyalkyl starch ethers which exhibit phenomenal viscosities in dilute aqueous solutions.

It is another object of the present invention to provide carboxyalkyl starch ethers substantially free from water soluble electrolytes.

It is a further object of the invention to provide carboxyalkyl starch ethers which will produce in aqueous solution a pH below that of the normal carboxyalkyl starch ether heretofore prepared, and which are substantially free from electrolytes.

It is a still further object of the invention to provide a process of producing the above products.

These and other objects of the invention will be more fully apparent from the following detailed description of the invention. Broadly, the invention involves the preparation of carboxyalkyl starch ethers which have substantially no water soluble electrolytes present and which produce in aqueous solution a pH lower than that of the normal carboxyalkyl starch ether. For purposes of illustration the invention will be described with reference to sodium carboxymethyl starch ether but it is to be understood that this is for purpose of illustration only and not as a limitation of the invention.

Sodium starch may be prepared by the reaction of aqueous sodium hydroxide on a suitable starch. The sodium starch may then be reacted with sodium chloracetate to convert the sodium starch to the sodium carboxymethyl starch ether. If this product is isolated by simple precipitation with methanol it will exhibit very low viscosities in dilute aqueous solution. Repeated precipitation from alcohol, however, produces a product of decidedly higher viscosity. By adjusting the pH of this product, as will be pointed out in further detail hereinafter, a product exhibiting phenomenal viscosity in dilute solution may be obtained. It is believed that the removal of water soluble electrolytes and the presence of some free carboxyl groups are responsible for the phenomenal viscosities observed. Sufficient of the carboxyl groups must, however, be present in the form of a water soluble derivative such as the alkali metal salts, in order to contribute water solubility to the product.

Several methods are available for removing the water soluble electrolyte and for adjusting the pH. Repeated precipitation from aqueous solution by means of alcohol results in some loss of product, and accordingly, it is preferred to employ methods which do not result in any appreciable loss. Extraction with methanol in a Soxhlet may also be employed. It is preferred, however, to reflux the impure product with aqueous methanol at an elevated temperature. It is believed that the hot aqueous methanol results in a partial swelling of the carboxymethyl salt and thus permits a more efficient removal of water soluble electrolytes. In any event the reflux method has been observed to possess pronounced advantages over the other methods.

The adjustment of pH may likewise be accomplished in a number of ways. For example, the addition of acid, either mineral or organic, prior to the removal of electrolytes will convert some of the carboxyl groups to free acid groups. It is preferred, however, to regulate the pH of the product during the reflux operation as this results in the simultaneous removal of water soluble electrolytes originally present in the product as well as the salt resulting from the reaction between the acid and the sodium carboxymethyl starch ether.

The viscosities obtainable by means of the present invention are truly phenomenal. A ¾% aqueous solution of the ordinary sodium carboxymethyl starch ether as heretofore known to the art, will show a viscosity ranging from several hundred to 2,000 or 3,000 centipoises. Products of the present invention which are substantially free from water soluble electrolytes and in which the pH has been adjusted to within the range of 4-7, exhibit viscosities of at least 50,000 centipoises in ¾% aqueous solution, and in most instances, viscosities in the range of 100,000 to 200,000 centipoises or greater in ¾% aqueous solution are readily obtainable. These solutions are so viscous that they lose nearly all tendency to flow. A large container of a ½ to ¾% solution can be inverted without any tendency for the solution to flow out of the container.

These viscous solutions can be diluted with large amounts of organic solvents without precipitating the starch derivatives and they can be heated and frozen with no apparent effect on the viscosity. Moreover, the addition of water soluble electrolytes readily alters the viscosity and in sufficient quantity will practically destroy any evidence of viscosity. This is of particular advantage where, as in some coating operations, the high viscosity is desired in order to get the coating in place, after which time the viscosity may be a disadvantage. This disadvantage of ordinary viscosity producing substances is not present in the present instance as the viscosity may be eliminated by the simple introduction of a water soluble electrolyte. Water insoluble salts may also be added with no apparent effect on the viscosity. Likewise, polyhydric alcohols such as glycerin and glycols, and also sugars such as sucrose and dextrose, may be introduced in moderate amounts into solutions of these products without any apparent effect on viscosity.

The following examples will serve to illustrate various aspects of the invention and are to be considered as illustrative only.

*Example 1*

A sodium carboxymethyl starch ether was prepared from white potato starch in the following manner: 55 parts of white potato starch were mixed with 150 parts of water. A solution containing 13.3 parts of sodium hydroxide in 40 parts of water was added with stirring. The resulting alkaline mixture was heated to 80° C. and when the mixture became uniform, a solution of sodium chloracetate (31.5 parts of chloracetic acid in 50 parts of water was neutralized with 13.3 parts of sodium hydroxide in 40 parts of water) was added. The resulting reaction mixture was heated to 80-85° C. with stirring for a period of 90 minutes and then cooled to room temperature. The reaction mixture was made acid to phenolphthalein with excess of dilute hydrochloric acid. After stirring, the reaction product was precipitated by the addition of methanol. The product was dried in methanol and later in a vacuum desiccator. The viscosity of a ¾% solution of the above isolated product was very low, in the range of 1,000 cps. However, conversion by repeated precipitation as indicated below produced a product displaying phenomenal viscosity.

Twenty parts of the above crude product were dissolved in 100 parts of water and two parts of 5N acetic acid were added. After stirring and standing for four hours, the product was precipitated by the addition of ethanol. The precipitated product was collected, dried in absolute ethanol, ground and placed in a vacuum desiccator. A ¾% solution of this product yielded a viscous solution showing a viscosity of 98,000 cps. using a Brookfield viscosimeter, #5 spindle at 2 R. P. M. The enhancement of the viscosity by further treatment is demonstrated as follows: 13.5 parts of the product referred to immediately above, was mixed with 67.5 parts of water and one part of 5N acetic acid was added. After stirring and standing for four hours, the product was collected by precipitation and dried as stated above. A ¾% solution of this salt-free product displayed a viscosity of 190,000 cps. (Brookfield #5 at 2 R. P. M.). The pH of this solution was in the range of 4.8. This solution is so viscous that it has lost nearly all tendency to flow and a large container could be inverted without any tendency for the solution to flow out of the container.

*Example 2*

A sodium carboxymethyl starch ether was prepared from mandioca starch by essentially the same method given in Example 1. The pH of the reaction mixture before precipitation was in the range of 5.6-5.7. The dried product was ground to a fine powder. A ¾% solution of this product displayed a low viscosity in the range of 1,000 cps.

Fifty-seven and seven-tenths parts of the above product were placed in an extraction thimble and extracted in the Soxhlet extractor in 80% methanol for a period of 8¼ hours. The product was collected and dried in the vacuum desiccator. A ¾% solution of this product displayed a viscosity of only 16,600 cps. (Brookfield #3 at 2 R. P. M.). This product was further modified in a number of ways. The above extracted product (10 parts) was dissolved in 100 parts of water and precipitated by the addition of methanol. The product was collected and dried. A ¾% solution of this product displayed a viscosity of 125,000 cps. (Brookfield #5 at 2 R. P. M.). The original extracted product (10 parts) was mixed with 250 parts of 80% methanol and the mixture was refluxed for five hours. The product so obtained displayed very good viscosity. However, when this product was again mixed with 250 parts of 80% methanol and refluxed, the product gelatinized. This mixture was refluxed for one hour and then 150 parts of absolute methanol were added and refluxing continued for an additional 15 minutes. Additional methanol was added to complete the precipitation. The product was collected and dried in a known manner. This salt-free product yielded a ¾% solution displaying the amazing viscosity of 234,000 cps. (Brookfield #6 spindle at 2 R. P. M.). The recording needle rapidly went off the scale when a #5 spindle was used, indicating a viscosity much greater than 200,000 cps. This extremely viscous solution did not show any tendency to flow when the container was inverted.

*Example 3*

A sodium carboxymethyl starch ether was prepared from mandioca starch essentially as previously described. This crude product was ground to a fine powder. One hundred parts of this derivative were mixed with 500 parts of 80% methanol and the mixture was refluxed for seven hours. The product was collected, dried and ground to a fine powder. A ¾% solution of this product showed a moderate viscosity of 33,000 cps. (Brookfield #4 spindle at 2 R. P. M.).

Ten parts of the above refluxed product were mixed with 150 parts of water and permitted to stand overnight. The product was precipitated from the aqueous solution by the addition of alcohol. The precipitated product was collected by filtration and dried in the vacuum desiccator. A ¾% solution of this product showed a phenomenal viscosity of over 200,000 cps. (Brookfield #5 spindle at 2 R. P. M.). This procedure was duplicated numerous times with only moderate modifications and yielded the same results. The results were readily reproducible. Again the container could be easily inverted without any tendency to lose the product. The above procedure was also carried out using isopropyl alcohol and dioxane instead of methanol with similar results.

*Example 4*

Fifty-five parts of potato starch were mixed with 150 parts of water and 6.67 parts of sodium hydroxide and 20 parts of water were added with stirring. The resulting alkaline starch mixture was heated to 65° C. until uniform. A solution of sodium chloroacetate (15.75 parts of chloracetic acid and 25 parts of water were neutralized with 6.67 parts of sodium hydroxide in 20 parts of water) was added and the resulting reaction mixture was maintained at a temperature of 60–68° C. for 90 minutes. The reaction mixture was stirred continuously during the heating period. After heating, the reaction mixture was cooled to room temperature and made slightly acid by the addition of dilute acetic acid. The product was precipitated from the reaction mixture by the addition of ethanol. This precipitated product was dried and ground to a powder. A ¾% solution of this crude product showed a low viscosity in range of 2,000 cps.

Ten parts of the above product was refluxed with 250 cc. of 80% methanol for six hours. The refluxed product was dissolved in water and precipitated by the addition of methanol. The product was collected and worked up in the usual manner. A ¾% solution of this sodium carboxymethyl starch ether showed the outstanding viscosity of 92,000 cps. (Brookfield #5 spindle 2 R. P. M.). The pH of this ¾% solution was in the range of 6.2.

*Example 5*

A sodium carboxymethyl starch ether was prepared from potato starch in the manner previously described and the reaction mixture containing electrolytes was made only slightly acid to phenolphthalein. The product was isolated, dried and ground. A ¾% solution showed very poor viscosity, less than 1,000 cps., and the pH was in the range of 7.3.

(a) Twenty parts of this product were refluxed with 250 parts of 80% methanol without any acetic acid for four hours. The product was worked up in the usual manner. A ¾% solution showed very poor viscosity of 1,000 cps. The pH was approximately 7.3.

(b) Twenty parts of the original product were refluxed with 250 parts of 80% methanol containing 0.075 part of 5N acetic acid for four hours. A ¾% solution of this product showed a somewhat better viscosity of 10,000 cps. The pH was approximately 6.9.

(c) Twenty parts of the original product were refluxed with 250 parts of 80% methanol containing 0.30 part of 5N acetic acid, for four hours. A ¾% solution of this product showed fair viscosity of 40,000 cps. The pH was approximately 6.3.

(d) Twenty parts of the original product were refluxed with 250 parts of 80% methanol containing 0.60 part of 5N acetic acid. A ¾% solution of this product showed a good viscosity of 86,000 cps. The pH was approximately 5.8.

The viscosities of these refluxed products were further enhanced by precipitation from aqueous solutions.

Thus the products of Example 5, parts a to d were dissolved in water and precipitated with methanol. The resultant products had the viscosities indicated, before and after reprecipitation.

| Product | Before | After |
|---|---|---|
| a | 1,000 | 3,000 |
| b | 10,000 | 26,000 |
| c | 40,000 | 108,000 |
| d | 86,000 | over 200,000 |

The effect of pH control is further demonstrated by the fact that when product a, referred to above, even after reciprocation, was refluxed again in 85% methanol containing a small amount of acetic acid (4.75 parts of product refluxed in 65 parts of 85% methanol containing .076 part of 5N acetic acid for a period of 2⅔ hours), it showed an increase in viscosity from 3,000 to 84,000 centipoises.

*Example 6*

A sodium alpha-carboxyethyl starch ether was prepared from an alkaline potato starch mixture and sodium alpha-chloropropionate in a manner previously described. The product was isolated, dried and ground to a fine powder. When this product was subjected to the previously described procedures, it yielded viscous ¾% solutions showing viscosity in range of 50,000 cps. at a pH in the range of 5.5.

*Example 7*

The invention is also applicable to the reaction products of bifunctional derivaties with the carboxyalkyl starch ethers. 50 parts of sodium carboxymethyl starch ether (containing water soluble electrolytes and producing a ¾% solution having a viscosity in the range of 1,000 cps.) were dissolved in 250 parts of 20% sodium hydroxide solution and 17.5 parts of 2-chloroethyl ether were added with stirring. After the 2-chloroethyl ether had been worked into the reaction mixture, the stirring was stopped and the reaction mixture was heated to 70° C. and the temperature was maintained within the range 68–72° C. The reaction mixture stiffened and became quite thick. After heating for seven hours, the reaction mixture was diluted with 1,000 parts of water and made just neutral to phenolphthalein with dilute acetic acid. The reaction product was precipitated by the addition of methanol and the precipitated product was collected and washed repeatedly with methanol and ether and finally dried. This product yielded a clear ¾% solution which displayed a viscosity of about 20,000 cps. (Brookfield #3, 2 R. P. M.).

This product was then subjected to refluxing with 85% methanol without any added acetic acid for a period of about 4 hours. It was then precipitated and recovered. This modified product produced a ¾% solution displaying a viscosity of 104,000 cps. and the solution had a pH of approximately 8.0. This product is referred to hereinafter as product A. When the water soluble electrolytes were removed from the sodium carboxymethyl starch ether used in this example, it produced a ¾% solution displaying a viscosity in excess of 200,000 centipoises at a pH in the range of 6.0.

Product A was then subjected to an additional refluxing treatment with varying amounts of acetic acid to demonstrate the effect of the pH on the product.

Five parts of product A was refluxed in 65 cc. of 85% methanol containing .04 cc. of 5N acetic acid for a period of two hours. Product B so prepared yielded a .75% solution showing a viscosity of 152,000 cps. The pH was in the range of 7.2.

Five parts of product A was refluxed in 65 cc. of 85% methanol containing .08 cc. of 5N acetic acid for a period of three hours. Product C so prepared yielded a .75% solution showing a viscosity of 140,000 cps. The pH was in the range of 6.4.

Five parts of product A was refluxed in 65 cc. of 85% methanol containing .10 cc. of 5N acetic acid for a period of three hours. Product D so prepared yielded a .75% solution showing a viscosity of 84,000 cps. The pH was in the range of 5.9.

Products C and D gave the visual appearance of higher viscosities than products A and B. Accordingly it was deemed desirable to test the effect of heat on the viscosities of these products. To this end a ¾% solution of product D was made with water at room temperature. The viscosity was measured at this temperature and at various elevated temperatures and again upon cooling. The results were as follows:

| Temperature | Viscosity Cps. |
| --- | --- |
| Room temperature | 84,000. |
| 80° | 156,000. |
| 82° | 172,000. |
| 88° | greater than 200,000. |
| 50° | greater than 200,000 } recording needle rapidly |
| 30° | greater than 200,000 } went off the scale. |

Apparently these products of lower pH are less readily dispersible than the products of high pH and necessitate dispersion at a more elevated temperature. Once the product is dispersed, the temperature of the solution apparently has little effect on the viscosity.

This is in direct comparison to the temperature effect on product A. A similar ¾% solution of product A was tested, having viscosities at various temperatures. The results were as follows:

| Temperature | Viscosity C. P. S. |
| --- | --- |
| Room temperature | 104,000 |
| 70° | 76,000 |
| 80° | 76,000 |
| 35° | 118,000 |
| Room temperature | 120,000 |

Thus product A appeared to be readily dispersible in water at room temperature and the resultant solution became somewhat less viscous as the temperature was increased. Upon cooling the solution, the viscosity again increased to approximately the same order of magnitude that it was originally. It will be apparent, therefore, that the products of lower pH possess a somewhat different nature from the sodium carboxymethyl starch ethers.

*Example 8*

Twenty-five parts of sodium carboxymethyl starch ether were dissolved in 100 parts of 5% sodium hydroxide solution. After complete solution was effected 1 part of glycerol dichlorohydrin was added with vigorous stirring. After a short period of heating, the reaction mixture thickened rapidly, and 500 parts of cold water were added with stirring. The reaction product was precipitated by the gradual addition of methanol and the product thus precipitated was collected and dried in the manner previously described. The reaction product thus obtained produced a ¾% solution having a viscosity within the range of 5,000 cps. This reaction product was then subjected to the following modifying procedure: It was refluxed with 80% methanol for a period of 4 hours; then dissolved in water and precipitated by the addition of methanol. The resulting modified product was collected by filtration and dried. The product thus obtained produced a ¾% solution having a viscosity of 59,000 cps. (Brookfield #4 spindle, 2 R. P. M.).

Other bifunctional derivatives may be used for reacting with carboxyalkyl ethers to produce products of the same general type. Thus bifunctional reagents such as epichlorohydrin, diethylene glycol bischloroformate, and other similar bifunctional reagents may be employed in reactions of this type to yield products similar to those previously described.

The high viscosity compositions herein described exhibit a pronounced salt effect. Thus the addition of minute quantities of various electrolytes greatly reduce the viscosity of the solution. For example, a ¾% solution having a viscosity of around 130-140 thousand cps. can be reduced to less than 100,000 cps. by the addition of 25 mg. of sodium chloride to 400 g. of viscous solution, and can be reduced to about 70,000 by the addition of a further 25 mg. of sodium chloride. In another instance a ¾% solution having a viscosity in excess of 100,000 cps. was reduced to about 60,000 cps. by the addition of 25 mg. of sodium chloride, to 400 g. of the viscous solution, and was reduced to 40,000 cps. by the addition of a further 25 mg. of sodium chloride.

It will be apparent to those skilled in the art that numerous variations in the above process and product are possible without departing from the spirit of the invention. Thus any starch such as mandioca, potato, corn, rice, wheat, or waxy maize may be used. Even flours, such as tapioca flour, may be employed. The degree of ether substitution is another variable which may be varied quite widely. Phenomenal viscosities have been obtained with the degree of substitution as low as 0.2. Higher degrees of substitution such as 0.3 to 1.0 result in somewhat increased viscosities.

Variations are likewise possible in the reflux procedure. In the examples, 80% methanol was used. It will be apparent that other concentrations such as for example from 70% to 90% may be used. Lower concentrations of alcohol tend to gelatinize the product at reflux temperature. This, however, is no disadvantage as the products can be precipitated by the addition of more alcohol or other organic solvents such as dioxane, acetone, ethanol, and isopropyl alcohol have been found successful in the reflux procedure. The amount of acetic acid or other acid used during the reflux will depend upon the pH desired. Time periods may also be varied. It will also be apparent that the length and the nature of the alkyl chain of the carboxyalkyl group may be varied. Thus carboxymethyl, -ethyl, -propyl, -butyl, and other groups, whether unsaturated or saturated, branched or straight chain, may be employed. Numerous other variations may be made within the invention without departing from the spirit thereof as pointed out in the appended claims.

I claim as my invention:

1. Water soluble salts of carboxyalkyl starch ether having a degree of substitution within the approximate range of 0.2 to 1.0, characterized by being substantially free from water soluble electrolytes, a ¾% aqueous solution of said ether having a pH within the range of 4–7 and having a Brookfield viscosity not substantially less than 50,000 cps.

2. Alkali metal carboxyalkyl starch ether having a degree of substitution within the approximate range of 0.2 to 1.0, characterized by being substantially free from water soluble electrolytes, a ¾% aqueous solution of said ether having a pH within the range of 4–7 and having a Brookfield viscosity not substantially less than 50,000 cps.

3. Alkali metal carboxymethyl starch ether having a degree of substitution within the approximate range of 0.2 to 1.0, characterized by being substantially free from water soluble electrolytes, a ¾% aqueous solution of said ether having a pH within the range of 4–7 and having a Brookfield viscosity not substantially less than 50,000 cps.

4. Water soluble salts of carboxyalkyl starch ether having a degree of substitution within the approximate range of 0.2 to 1.0, characterized by being substantially free from water soluble electrolytes, a ¾% aqueous solution of said ether having a pH within the range of 5.5 to 7 and having a Brookfield viscosity not substantially less than 100,000 cps.

5. Water soluble salts of carboxymethyl starch ether having a degree of substitution within the approximate range of 0.2 to 1.0, characterized by being substantially free from water soluble electrolytes, a ¾% aqueous solution of said ether having a pH within the range of 5.5 to 7 and having a Brookfield viscosity not substantially less than 100,000 cps.

6. Process of producing water soluble salts of carboxyalkyl starch ether capable of producing improved viscosity in dilute aqueous solution which comprises removing substantially all the water soluble electrolytes from a water soluble salt of carboxyalkyl starch and converting sufficient of the salt groups to free carboxyl groups such that a ¾% aqueous solution of the product will have a pH within the range of 4–7.

7. Process of producing water soluble salts of carboxyalkyl starch ether capable of producing improved viscosity which comprises dissolving a water soluble salt of carboxyalkyl starch containing water soluble electrolytes in an aqueous solution containing an acid, and repeatedly precipitating said starch from aqueous solution to remove substantially all the water soluble electrolytes therefrom, the quantity of acid employed being sufficient to adjust the pH of the product such that a ¾% aqueous solution will have a pH within the range of 4–7.

8. Process of producing water soluble salts of carboxyalkyl starch ether capable of producing improved viscosity in dilute aqueous solution which comprises subjecting a water soluble salt of carboxyalkyl starch containing water soluble electrolytes to Soxhlet extraction with an alcohol and then precipitating the carboxyalkyl starch from aqueous solution, sufficient of the salt groups being converted to free carboxyl groups prior to the precipitation such that a ¾% aqueous solution will have a pH within the range of 4–7.

9. Process of producing water soluble salts of carboxyalkyl starch ether capable of producing improved viscosity in dilute aqueous solution which comprises refluxing a water soluble salt of carboxyalkyl starch containing water soluble electrolytes, at an elevated temperature with an organic solvent containing an acid and then precipitating the carboxyalkyl starch from aqueous solution, the quantity of acid being sufficient to adjust the pH of the product such that a ¾% aqueous solution will have a pH within the range of 4–7.

10. Process of producing water soluble salts of carboxyalkyl starch ether capable of producing improved viscosity in dilute aqueous solution which comprises refluxing a water soluble salt of carboxyalkyl starch containing water soluble electrolytes, at an elevated temperature with aqueous methanol containing 70–90% methanol containing an acid to control the pH of the product, and then precipitating the carboxyalkyl starch from aqueous solution, the quantity of acid being sufficient to adjust the pH of the product such that a ¾% aqueous solution will have a pH within the range of 4–7.

OWEN A. MOE.

REFERENCES CITED

The following references are of record in the file of this patent:

UNITED STATES PATENTS

| Number | Name | Date |
|---|---|---|
| 1,350,820 | Lilienfeld | Aug. 24, 1920 |
| 2,116,867 | Kreimeier | May 10, 1938 |
| 2,148,951 | Maxwell | Feb. 28, 1939 |

OTHER REFERENCES

Eynon et al., "Starch," Eng. Ed. 1928, pages 53–54, 2 pages.

Chemical Abstracts, vol. 38 (1944) page 2232, 1 page.

Certificate of Correction

Patent No. 2,523,709 — September 26, 1950

OWEN A. MOE

It is hereby certified that error appears in the printed specification of the above numbered patent requiring correction as follows:

Column 5, line 22, for "chloroacetate" read *chloracetate*; column 6, line 22, for "reciprocation" read *reprecipitation*; line 42, for "derivaties" read *derivatives*; column 7, line 66, for "magniture" read *magnitude*; and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*